United States Patent [19]

Freed et al.

[11] 3,922,707

[45] Nov. 25, 1975

[54] DC TESTING OF INTEGRATED CIRCUITS AND A NOVEL INTEGRATED CIRCUIT STRUCTURE TO FACILITATE SUCH TESTING

[75] Inventors: Larry E. Freed, Poughkeepsie; William J. Nestork, Wappingers Falls; Daniel Tuman, Poughkeepsie, all of N.Y.

[73] Assignee: IBM Corporation, Armonk, N.Y.

[22] Filed: June 10, 1974

[21] Appl. No.: 477,871

Related U.S. Application Data

[63] Continuation of Ser. No. 319,586, Dec. 29, 1972, abandoned.

[52] U.S. Cl. ............... 357/48; 307/303; 324/158 R; 357/51; 357/68; 357/86

[51] Int. Cl.[2] ........................................ H01L 27/04

[58] Field of Search ..... 324/158 R, 158 T; 307/213, 307/303; 357/48, 51, 68, 86

[56] References Cited

UNITED STATES PATENTS

| | | | |
|---|---|---|---|
| 3,283,170 | 11/1966 | Buie | 307/213 X |
| 3,363,154 | 1/1968 | Haas | 357/51 |
| 3,558,992 | 1/1971 | Heuner et al. | 357/51 |
| 3,617,778 | 11/1971 | Korom | 307/213 |
| 3,629,667 | 12/1971 | Lubart et al. | 357/51 |
| 3,644,802 | 2/1972 | Dingwall | 357/51 |
| 3,676,713 | 7/1972 | Wiedmann | 307/303 |
| 3,676,714 | 7/1972 | Wensink et al. | 307/303 |
| 3,689,803 | 9/1972 | Baker et al. | 357/48 |
| 3,707,036 | 12/1972 | Okabe et al. | 357/51 |
| 3,751,680 | 8/1973 | Hodges | 307/213 |

*Primary Examiner*—William D. Larkins
*Attorney, Agent, or Firm*—J. B. Kraft

[57] ABSTRACT

In integrated semiconductor circuits comprising a plurality of active and passive devices interconnected by conductive means into a selected circuit configuration, the improvement wherein said circuit configuration is arranged so as to be free of possible paths displaying reactance which would be alternative to selected substantially reactanceless paths terminating in critical circuit nodes in the event of structural failure of one of said reactanceless paths, whereby the DC testing of the integrated circuit is not affected by such alternative paths.

6 Claims, 20 Drawing Figures

DC TESTING OF INTEGRATED CIRCUITS AND A NOVEL INTEGRATED CIRCUIT STRUCTURE TO FACILITATE SUCH TESTING

This is a continuation of application Ser. No. 319,586 filed Dec. 29, 1972, now abandoned.

BACKGROUND OF INVENTION

The present invention relates to testing of circuits, particularly integrated circuits. More particularly, it relates to the DC testing of integrated circuits, particularly large scale integrated circuits.

Because of the microminiature device size and high device and circuit density, the art of testing of integrated circuits has passed the stage of testing the individual devices or even the individual circuits which make up the integrated circuit. Because of the physical inaccessibility of the individual circuits which make up a given integrated circuit, present testing involves the application of signals to a plurality of input terminals in the integrated circuit and monitoring or sensing the resulting signals at a plurality of output terminals in the the circuit. Such testing is presenting performed primarily with respect to the DC parameters of the integrated circuit. e.g., switching thresholds, saturation levels, the size of the load which the circuit is capable of driving and the immunity of the integrated circuit to noise. Such DC functional tests are usually performed directly on the integrated circuit chip by applying to specific input points or contact terminals of the integrated circuit, a DC signal pattern, permitting the DC pattern to propagate through the integrated circuit and monitoring or sensing the resulting DC pattern at a plurality of output terminals in the integrated circuit. In such DC testing, the test pattern is a bilevel input electrical signal pattern made up of a plurality of pattern increments in sequence, each increment comprising a plurality of parallel bilevel signals corresponding to the plurality of input terminals in the circuit to be tested. A corresponding resulting output signal is sensed at the plurality of points in the circuit being tested.

Suitable methods and apparatus for automatically generating such test patterns for testing the DC functional parameters of complex integrated circuits are generally known in the art. They are described for example, in U.S. Pat. Nos. 3,614,608 and 3,633,100.

While DC functional testing of complex integrated circuits has been extensively implemented in the semiconductor field, the testing of AC parameters which includes such factors as rise time, fall time, and circuit delays, has been in relatively limited useage primarily because AC testing is difficult, expensive and time-consuming. Accordingly, it is highly desirable in the testing of integrated circuits to provide a DC testing system which gives a proper indication of the operability of the integrated circuit without the necessity of resorting to AC testing. The avoidance of Ac testing in favor of DC testing alone is based upon the assumption that, at the present stage of the integrated circuit fabrication art, it is possible to fabricate integrated circuits within such narrow structural and processing tolerances that if the integrated circuit has no major structural failures, e.g., short circuits due to a structural defects, missing devices or device contacts, the integrated circuit will have satisfactory AC parameters. DC testing has been considered to be sufficient to determine the presence of such major circuit faults and to fail the integrated circuit if such faults exist.

We have now found that in DC testing, it is possible in the case of a major structural failure for the integrated circuit to operate in such a fashion that there will be no detectable DC failure and yet, an AC parameter of the circuit may be so affected that the circuit is actually not functional.

The reason for this potential shortcoming in DC testing is that DC testing is based upon the assumption that the circuit paths in the integrated circuit chip through which the test signals applied to the input terminals propagate before reaching the output terminals are substantially reactanceless, i.e., they contain no significant capacitance or inductance which would introduce a time factor into a propagating signal. In other words, by the term "substantially reactanceless," as used in the present specification, we mean that the capacitance or inductance is minimal. It is not significant enough to introduce a time factor which would affect the propagating signal. As will be hereinafter explained in greater detail with respect to FIG. 2B, even a "reactanceless''path has some minimal reactance; otherwise, the rise time $S_1$ in FIG. 2B would be vertical. However, this minimal reactance results in a time factor within acceptable operating limits for the integrated circuit. We have found that there are structural failures in the integrated circuit chip along critical circuit paths which result in a propagating signal proceeding along an available alternative path which displays considerable reactance. As a result, when a structural failure does occur along such a critical path, a propagating DC test signal may take such an alternative reactance path and thereby reach the appropriate output terminal at a level proper to indicate that the integrated circuit is functional. Actually, the integrated circuit is not functional since the circuit cannot properly function with such an alternative reactance path since the reactance will affect an AC parameter of the circuit, such as rise time or fall time, to a sufficient extent to render the integrated circuit inoperative. Accordingly, structural failures of the type described tend to make DC testing unreliable and force the utilization of the more expensive and time-consuming AC testing.

SUMMARY OF THE INVENTION

Accordingly, it is a primary object of the present invention to provide a method of DC testing of integrated circuit chips which avoid the need for further AC testing.

It is another object of the present invention to provide a DC testing method which is not affected by alternative paths displaying significant reactance in the event of structural failures in the integrated circuit.

It is yet another object of the present invention to provide a novel integrated circuit structure wherein structural failures do not cause incorrect DC test results.

It is an even further object of the present invention to provide a novel integrated circuit structure which may be completely tested by a DC test method and does not require further AC testing.

In accordance with the present invention, there is provided in an integrated circuit comprising a plurality of active and passive devices interconnected by conductive means into a selected circuit configuration, the improvement wherein the circuit configuration is arranged so as to be free of possible paths displaying significant reactance which would be alternative to certain selected substantially reactanceless paths terminating in critical circuit modes in the event of structural failure of one of said reactanceless paths, whereby the DC testing of the integrated circuit is not affected by such alternative paths which would otherwise cause incorrect DC test results. In integrated circuits, the significant reactance which normally causes the problem in the alternative paths displaying reactance is usually a capactive reactance but inductive reactance is present in integrated circuits, and the alternative problem path may also be one displaying inductive reactance.

Through the utilization of this novel integrated circuit configuration which is free of possible alternative paths displaying significant reactance, the present invention provides a method of DC testing wherein the DC test signals applied to the input terminals of the integrated circuit may propagate through the circuit to output terminals where the resulting signals are sensed without proceeding along possible alternative paths displaying significant reactance in the event of a structural failure in the circuit. Accordingly, the sensed output signals will provide correct test results, i.e., if there is a structural failure, the integrated circuit will fail the test rather than indiciate a pass because the circuit has taken an improper alternative path displaying reactance.

In the practice of the present invention, the circuit designer of ordinary skill who is arranging the integrated circuit layout may readily determine by analyzing the schematic drawing of the circuit which he is embodying in his integrated circuit layout, a plurality of critical pairs of circuit nodes where a structural failure in the integrated circuit path between such nodes, e.g., a missing resistor or resistor contact, will result in a remaining circuit path between the pair of nodes which has significant reactance.

Having identified such cricital circuit paths having such alternative paths displaying reactance, the designer may, in accordance with the present invention, utilize one or more of a plurality of possible expedients in order to insure that the integrated circuit is substantially free of such possible alternative paths displaying reactance. The integrated circuit configuration may be arranged so that one or more of the possible alternative paths is in series with at least a portion of the reactanceless path to which it corresponds. This portion may be a resistor whereby if the resistor is defective or missing, both the reactanceless path and the alternative path will not function. Likewise, the alternative path may share a common electrical contact with the reactanceless path, whereby if the common contact is not functional, both paths will function.

The circuit configuration may be arranged so that one or more of the selected reactanceless paths has an alternative reactanceless path which shunts the possible alternative path displaying significant reactance in the event of a structural failure of the selected path. This shunting reactancelesss path may be designed so as to have a resistance sufficiently close to that of the selected path so as to serve the function of the selective path in the integrated circuit operation. In this case, the DC test will indicate a "pass" which will be correct since the integrated circuit will be functional. On the other hand, the shunting reactanceless path may have a resistance sufficiently different from that of the selected path so as to force a "fail" of the DC test which would be truly indicative of the structural failure in the original reactanceless path.

By another expedient, the circuit configuration is arranged so as to dispose the possible alternative paths displaying reactance sufficiently close to their corresponding reactanceless paths that, in the event of a structural failure along a reactanceless path, the structural failure in the alternative path is likely to occur.

The foregoing and other objects, features and advantages of the invention will be apparent from the following more prticular description and preferred embodiments of the invention as illustrated in the accompanying drawings.

DESCRIPTION OF PREFERRED EMBODIMENTS

Figures 1, 2, 2A, 2B, 3, 3A:
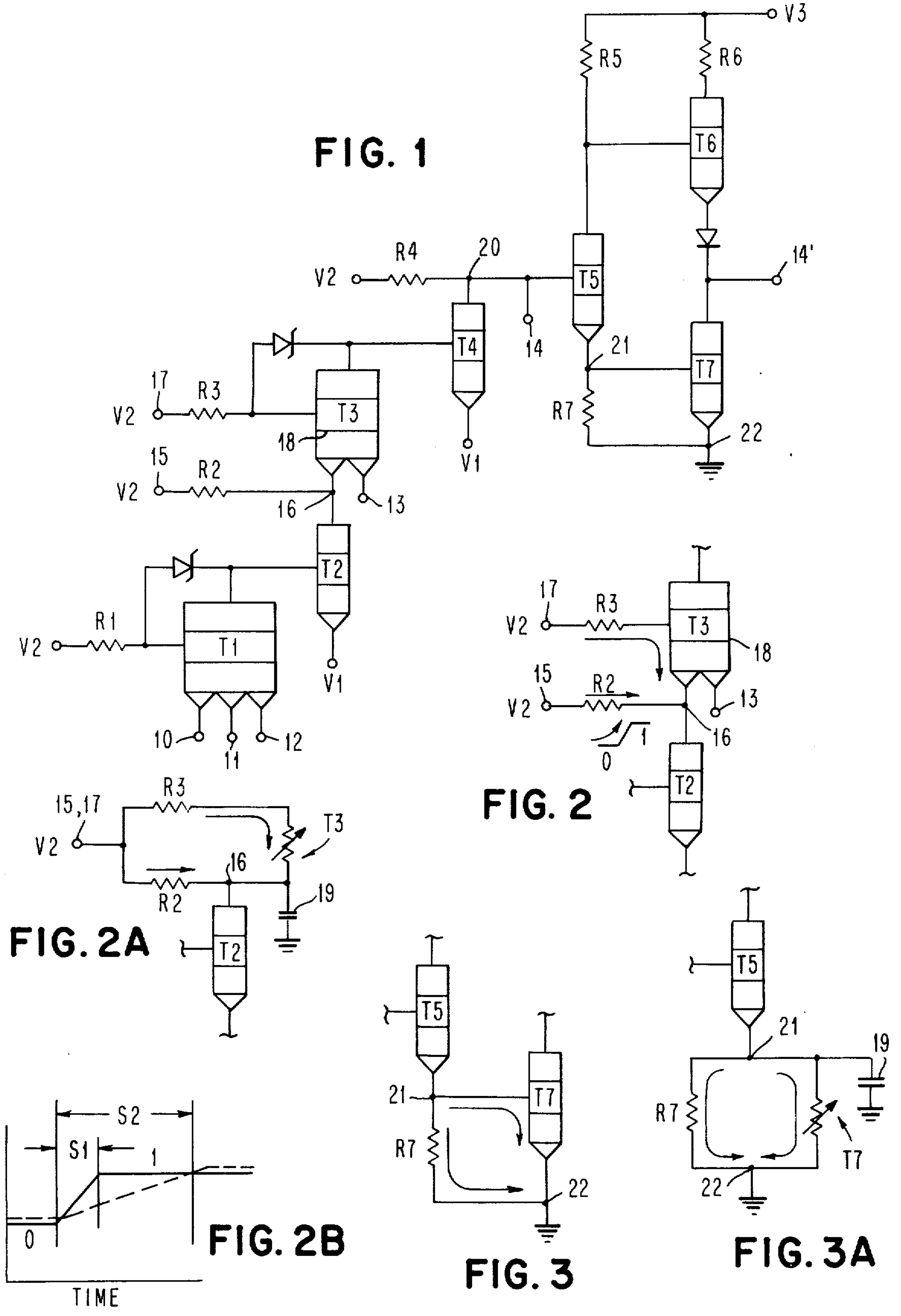
FIG. 1 is a schematic drawing of a circuit illustrative of a circuit in which selected reactanceless subject paths have possible alternative paths displaying reactance.
FIG. 2 is a more specific schematic of a portion of the schematic of of the circuit of FIG. 1 illustrating a reactanceless path and its corresponding alternative path displaying reactance.
FIG. 2A is the equivalent circuit of that of FIG. 2 illustrating the reactanceless and reactance paths.
FIG. 2B is a timing diagram comparing, rise time, an AC parameter, along the reactance and the reactanceless paths of FIG. 2A.
FIG. 3 is a more specific view of a portion of the circuit-schematic of FIG. 1 illustrating another reactanceless circuit path and its alternative path displaying reactance.
FIG. 3A is the equivalent circuit of the portion shown in FIG. 3.

With reference to FIG. 1, there is shown, for purposes of illustrating the testing method and novel testable integrated circuit structuure of the present invention, a schematic drawing of a portion of circuitry to be embodied in an integrated circuit chip. In the practice of the present invention, the integrated circuit structure designer will, for example, work from a schematic such as that in FIG. 1. From this schematic, he should be able to readily determine which reactanceless circuit paths would have alternative paths displaying reactance in the event of a structural failure within the reactanceless path. Let us consider the circuit of FIG. 1 in this regard. The transistors T1-T7 are NPN transistors having substantially matched characteristics since they will be fabricated in the same process in a monolithic substrate. The voltage supplies have substantially the following value: $V_1$ = +0.8V, $V_2$ = +2.6V, $V_3$ = +5V. The resistor values are: R1-R-5 and R7 each equal 3 K ohms while R6 = 160 ohms.

In the DC testing of the integrated circuit which is to be the embodiment of the schematic of FIG. 1, the testing will be carried out through the application of various combinations of bilevel input signals to input circuit terminals 10, 11, 12, and 13. The input signals will be permitted to propagate through the paths in the circuit to output terminals 14 and 14' where the resulting signals will be sensed utilizing DC test systems similar to those described in the previously mentioned patents in order to determine whether the integrated circuit output signals correspond to the reference expected for the particular circuit, in which case, the circuit will "pass" or fail to correspond to the reference, in which case, the circuit will "fail" the particular DC test. The circuit in FIG. 1 utilizes essentially TTL bilevel logic in its operation. Since, as has been previously mentioned, DC testing is based upon the assumption that the applied test bilevel signals will propagate along substantially reactanceless paths, reactance elements such as NP junctions along such paths are considered to be either totally "open" or totally "closed."

In anay event, the circuit shown in FIG. 1 does have two reactanceless paths which would have alternative paths displaying reactance in the event of a structural failure. The first reactanceless path extends from node 15, which is connected to the $V_2$ voltage, through resistor $R_2$ to node 16. In the event of a structural failure along this reactanceless path, an alternative path displaying reactance would be from node 17, to which voltage $V_2$ is also connected, through resistor $R_3$, which has the same value as $R_2$, across base-emitter junction 18 of $T_3$ to node 16. A portion of the circuit described with the two paths illustrated by arrows is shown in greater detail in FIG. 2. In FIG. 2A, there is shown the equivalent circuit representation of the two described paths. The path through resistor $R_2$ is primarily a resistor or R path, while the path through resistor $R_3$ and junction 18, which may be represented as a variable resistance in combination with a nodal capacitance 19,.is an RC path which has a significant capacitive reactance factor. Suppose that the path from node 15 through $R_2$ to node 16 is defective. This may result from a variety of causes: during integrated circuit formation, due to a mask defect during a diffusion step, resistor $R_2$ may be completely missing, or one of the contacts to resistor $R_2$, either from node 15 or node 16, may be missing, or a structural defect in the integrated circuit substrate, such as a fault, may be located in coincidence with resistor $R_2$ and, therefore, render $R_2$ inoperative.

If the path through $R_2$ is defective, an applied DC test signal propagating through the circuit would be effected at node 16 by the alternative circuit path through $R_3$ and $T_3$ which is an RC circuit path. To illustrate, let us suppose that the combination of bilevel DC signals applied to terminals 10-13 should be sufficient to cause a switch at node 16 from the zero to the one level as shown in FIG. 2. If the reactanceless path through resistor $R_2$ does not have a structural defect in the integrated circuit embodiment, and there are no other defects in the integrated circuit structure, transistor $T_3$ should be rendered non-conductive, thereby rendering transistor $T_4$ conductive so that node 20 and, consequently, output terminal 14, which is being sensed by the DC tester, switches to the zero level.

The switch from zero to one at node 16 in the case where there is no defect along the reactanceless path is shown in the pulse time diagram of FIG. 2B as the solid line waveform. The rise time $S_1$, an AC parameter, iis within acceptable limits. Of course, the DC test system has no way of determining this. The DC system operates on the assumption that if the resulting output signal "passes" the DC test, the integrated circuit devices have been matched and tailored so that the AC parameters will be acceptable.

The DC testing is further based on the assumption that if the reactanceless path from nodes 15 to 16 has a structural defect, the DC test will indicate a "fail." In other words, output terminal 14 will not switch.to a zero. Unfortunately, because os the presence of an alternative path displaying reactance from node 17, which is at the same voltage level as node 15, through resistor $R_3$ and PN junction 18, output terminal 14 will still eventually switch to zero which would incorrectly indicate a DC test "pass." This improper test result occurs because in the presence of this alternative RC path, node 16 still does rise from zero to one as shown by the dotted waveform in FIG. 2B. However, its rise time, an AC parameter, $S_2$ is so long that the circuit cannot properly function in actual operation.

Without again going into extensive detail, there is a second illustrative reactanceless path in the circuit of FIG. 1 which also has an alternative path displaying reactance. If there is a defect in the reactanceless path from node 21 through resistor $R_7$ to node 22, there would be an alternative path displaying reactance from node 21 through transistor $T_7$ to node 22. This section of the circuit is shown in greater detail in FIG. 3 wherein the reactanceless and the alternative paths are illustrated. FIG. 3A illustrates the equivalent circuits for the two paths, with the alternative path through transistor $T_7$ being shown as a RC path which, of course, has capacitive reactance. Accordingly, if the desired path through resistor $R_7$ is inoperative due to a structural defect in the integrated circuit, the path from node 21 through transistor $T_7$ will manifest itself so that the DC signal output at node 15 will incorrectly be the same as it would have been if the path through resistor $R_7$ were operational; however, since $R_7$ is inoperative, the time required to switch $T_5$ to a down (0) level is significantly greater because the nodal capacitance at $T_5$'s emiter cannot discharge through the designed resistance path $R_7$. Hence, the RC time constant is determined by the variable resistance between $T_7$'s base and emitter as node 21 decreases in voltage; $T_7$ turns off; and the associated resistance increases, hence the variable resistance.

Once the integrated circuit designer recognizes critical circuit nodes between which such paths displaying additional reactance would be expected to exist, he can lay out his integrated circuit configuration so that the circuit is free of such possible alternative paths displaying reactance in the event of structural failure of one of said reactanceless paths. Thus, if such alternative DC paths can be eliminated, in the event of such structural failure, the DC test results will not be masked and will correctly indicate a "fail." We will now describe, by way of illustration, a number of expedients which would be available to the integrated circuit designer in order to insure the absence or the elimination of such possible alternative paths. The circuit configuration can be arranged so that a possible alternative path displaying reactance is in series with at least the portion of the reactanceless path to which it corresponds.

Figure 4A:
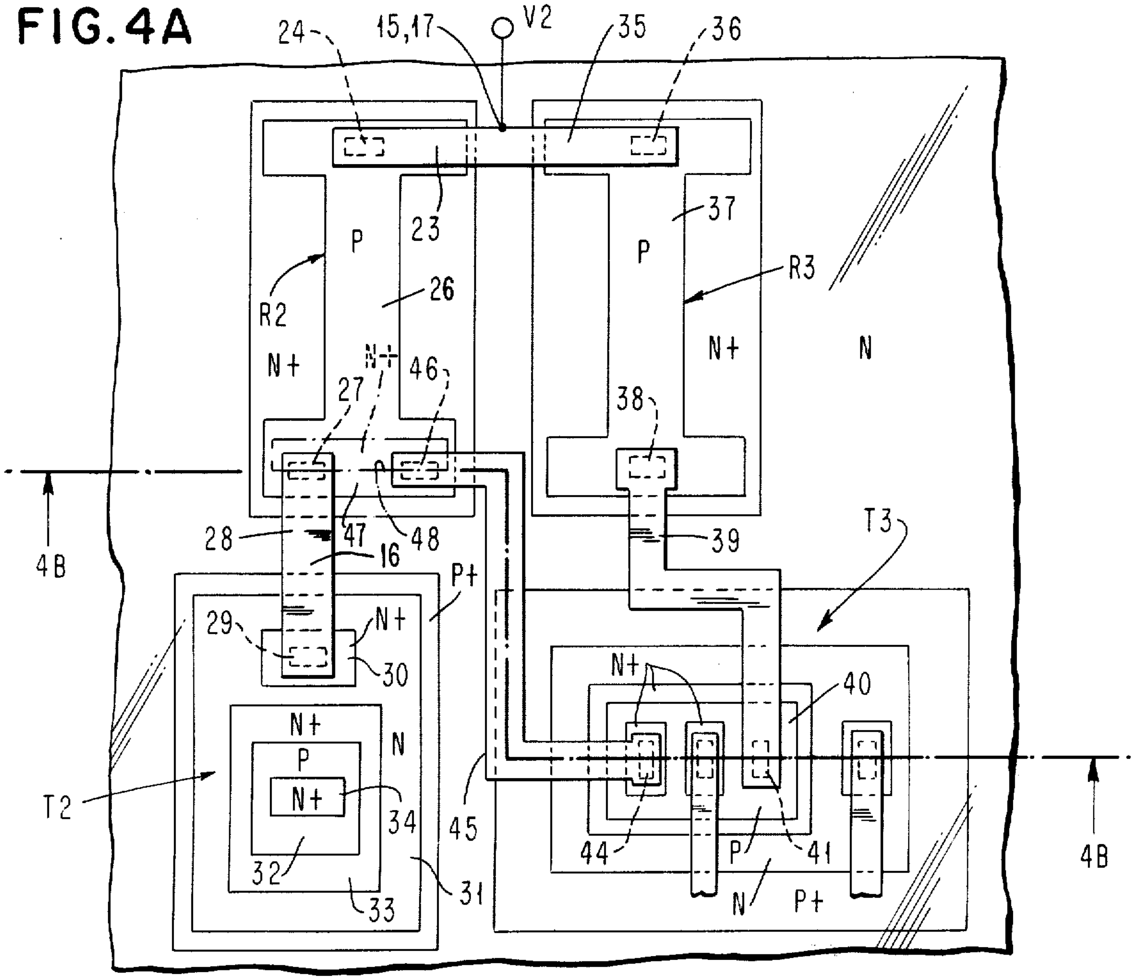
FIG. 4A is a plan view of an integrated circuit layout embodying the schematic equivalent circuit of FIG. 4.
Figure 4B:
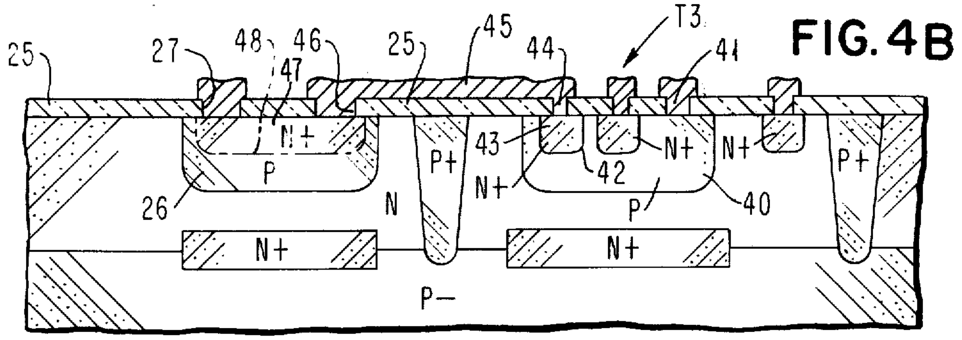
FIG. 4B is a cross-section of FIG. 4A along line 4B—4B.
Figure 4:
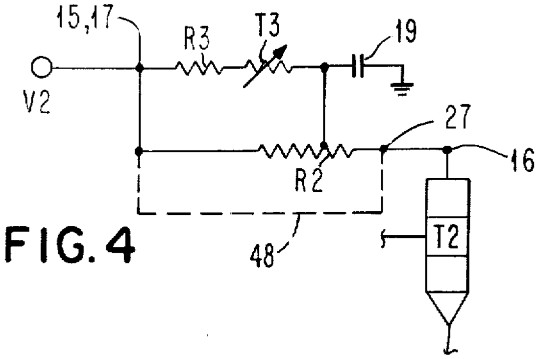
FIG. 4 is an equivalent circuit which is the equivalent circuit of FIG. 2A modified to insure that the alternative path displaying reactance will not function in the event of a structural failure in the reactanceless path.

With reference to FIGS. 4, 4A and 4B, the equivalent circuit in FIG. 4 is the equivalent circuit of FIG. 2A modified so that the alternative reactance path through resistor $R_3$ is in series with a portion of the reactanceless path through resistor $R_2$. The integrated circuit structural layout which embodies the equivalent circuit of FIG. 4 is shown in FIGS. 4A and 4B.

The illustrative integrated circuit of FIGS. 4A and 4B, as well as the other integrated circuits which will be subsequently described, may be fabricated by any of the integrated circuit techniques well known in the art. For example, the circuits shown may be conveniently fabricated by the methods set forth in U.S. Pat. No. 3,539,876. As set forth in said patent, fabrication involves a series of steps during which conductivity-determining impurities are selectively introduced into various regions in the semiconductor substrate to form the operative regions of the active and passive devices. Selective arrangement of the introduced impurities is customarily controlled through a series of masks used during their respective introduction steps. In more advanced technologies, electrical and electromagnetic fields may be utilized in place of masks to control such selective introduction. While diffusion has been conventionally the most extensively used method for the introduction of the impurities, other methods such as ion implantation have also been used.

Referring again to FIGS. 4A and 4B, the basic reactanceless path proceeds from voltage supply $V_2$ through node 15 to interconnector segment 23 which passes through opening 24 in insulative layer 25 to contact P region 26 which constitutes resistor $R_2$. The path continues through opening 27 into contact with metallic interconnector 28 at node 16 where it is, in turn, connected through contact opening 29 to N+ collector contact 30 to collector region 31 of transistor $T_2$ which further includes base region 32, subcollector region 33, and emitter region 34. At the same time, the path from $V_2$ to transistor $T_3$ runs through interconnector segment 35, contact opening 36 into contact with P region 37 which acts as resistor $R_3$, out contact opening 38 to metallic interconnector 39 which runs into contact with P region 40, which is the base of transistor $T_3$, through contact opening 41. To this point, we have in effect the operational path of the base region of transistor $T_3$ through is $R_2$ voltage source. However, the alternative path to that through resistor $R_2$ would further include a segment crossing emitter-base junction 42 to emitter 43 in transistor $T_3$. Emitter-base junction 42 would provide the capacitive reactance 19 of the equivalent circuit of FIG. 4. Emitter 43 is, in turn, connected through contact opening 44 to metallization segment 45 which, in turn, is connected back to P region 26 of resistor $R_2$ through contact opening 46. Thus, the portion 47 of P type region 26 between contact openings 46 and 27 is a portion of the reactanceless path through resistor $R_2$ which is in series with the alternative path displaying reactance through resistor $R_3$ and transistor $T_3$. Likewise, contact 27, as well as metallization segment 28, may also be considered to be a portion of the reactanceless path which is common to the alternative path.

In the present embodiment, the N+ region shown in phantom lines between contacts 27 and 28 is to be ignored and considered non-existent; it will be described hereinafter with respect to another embodiment of the present invention.

With the integrated circuit configuration shown in FIGS. 4A and 4B, should P region 26, which provides resistor $R_2$, turn out to be completely missing because of a masking error, a condition which can occur in integrated circuit manufacturing, not only will the reactanceless path through resistor $R_2$ be inoperative, but the alternative path through resistor $R_2$ will also be inoperative since portion 47 of P type region 26, which connects through contact openings 27 and 46 in the alternative path, will also be missing.

Likewise, should a contact between interconnector segment 28 and P type resistor region 26 fail to be made because of a missing contact opening 27 in a contact opening masking step, not only will the reactanceless path through resistor $R_2$ to node 16 be inoperative, but the alternative path displaying reactance through resistor $R_3$ and transistor $T_3$ would also be inoperative. As a result, in the cases where either P type resistor region 26 or contact 27 are missing, the circuit would be free of any alternative path displaying reactance which would mask the DC test results to indicate a "pass" when the condition should be "fail."

Again, with respect to FIGS. 4–4B, in some instances, the required characteristics of the circuit may be such that in the actual operation of the integrated circuit, the functioning circuit cannot tolerate an arrangement wherein the alternative reactance path is eliminted by placing it in series with a portion of the resistor in the reactanceless path, e.g., resistor $R_2$. In other words, in the circuit shown in FIGS. 4–4B, in the case where the circuit is good and there are no structural failures, the path between emitter 43 and circuit mode 16 cannot properly function with a portion of it passing through a relatively higher resistance region 47 of resistor $R_2$. In such a case, we may resort to the arrangement shown in phantom lines in FIGS. 4A and 4B wherein a relatively very low N+ region 48 shown in phantom lines extends from contact with a portion of the metallurgy in opening 46 into contact with a portion of the metallurgy in contact opening 27. Accordingly, low resistivity region 48 provides a low resistance path between contacts 46 and 27 which does not add a high resistance to the alternative path. With this embodiment, metallization in contacts 27 and 46 respectively makes suitable contacts with both P type resistor region 26 as well as the N+ low resistance path 48. With this arrangement, if contact opening 27 to resistor $R_2$ is not made, not only will the reactanceless path from $V_2$ to node 27 be non-operational, but the alternative path displaying reactance will also be non-operational because it too must pass through contact opening 27 in order to reach node 26.

However, in this latter case, if P type resistor 26 is missing, the alternative path through resistor $R_3$ and transistor $T_3$ may still be functional, because N+ region 48 would still provide an interconnection between the metallization and contact opening 46 with that in contact opening 27. Therefore, this latter structural arrangement is of value primarily in integrated circuit configurations wherein the contact opening is much more likely to be missing than P type resistor region 26 and the added resistance imposed upo the path from emitter 43 to node 16 by region 47 would interfere with the operation of this path in a good integrated circuit. It follows then, when forming the layout of his integrated circuit in accordance with the principles of the present invention, the circuit designer would be faced with a "trade-off" between whether the operation of the integrated circuit could tolerate the small additional resistance imposed upon the path through $R_3$ and $T_3$ to node 16 in return for insuring more accurate DC test results in the event that P type resistor diffusion 26 is missing or defective.

Figure 5A:
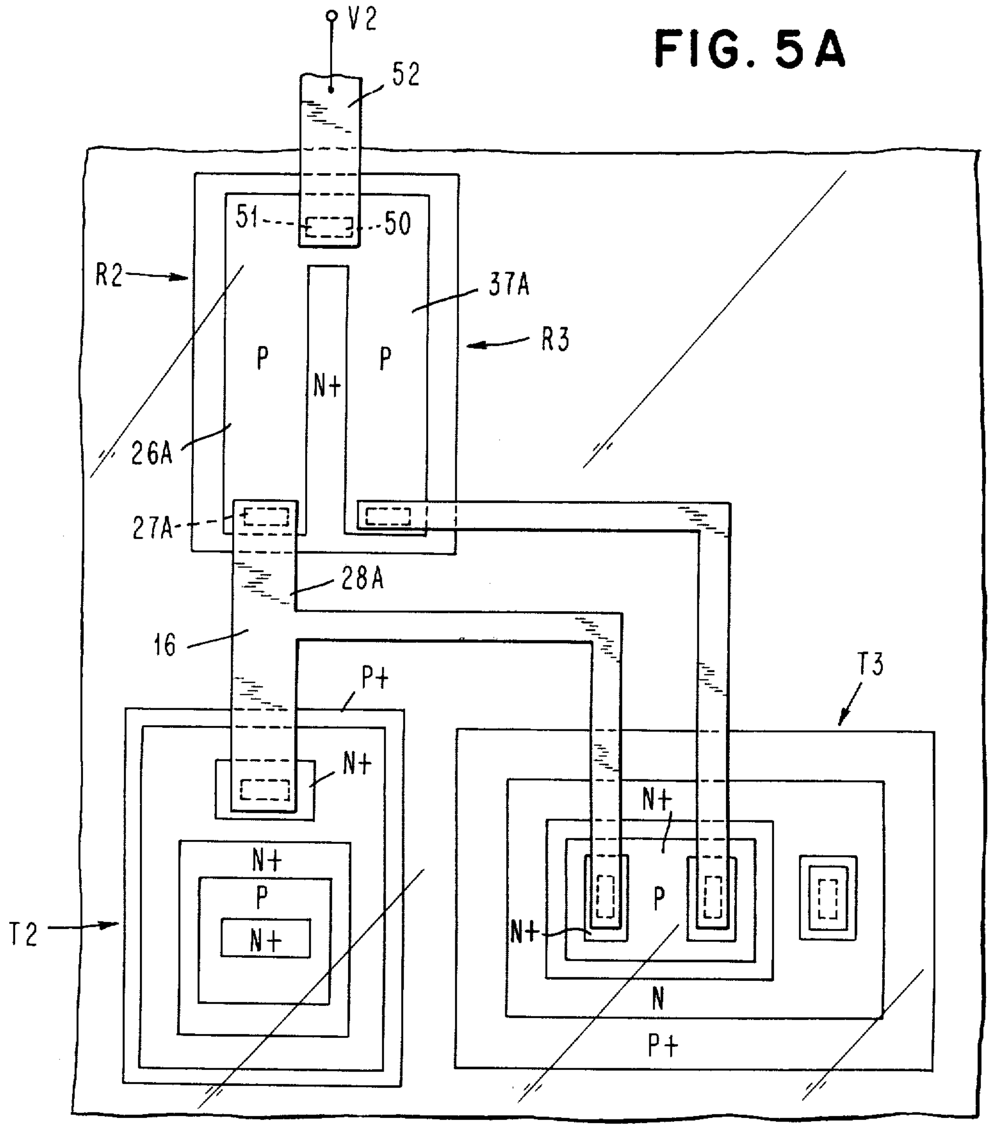
FIG. 5A is an integrated circuit layout configuration which embodies the schematic circuit of FIG. 5.
Figure 5:
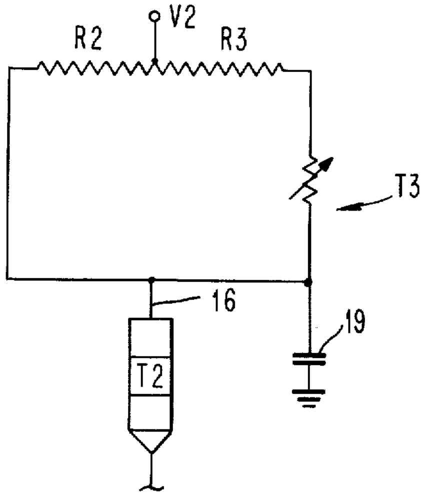
FIG. 5 is a schematic equivalent circuit illustrating another modification of the equivalent circuit of FIG. 2A to insure that the alternative path displaying reactance will not function in the event of a structural failure along the reactanceless path.

With respect to FIGS. 5 and 5A, there will be described another expedient utilizable in carrying out the present invention. This expedient is shown in FIG. 5 as an equivalent circuit which represents the equivalent circuit of FIG. 2A modified to include the present expedient. Resistor $R_2$ in the reactanceless path between the $V_2$ voltage source and node 16, as well as $R_3$ on the reactance path between $V_2$ and node 16, share a single common contact 50. The equivalent circuit of FIG. 5 is shown embodied in an integrated circuit in FIG. 5A. Transistors $T_2$ and $T_3$ in FIG. 5A are substantially the same in structure as those in FIG. 4A. Resistors $R_2$ and $R_3$ are, in effect, a continuous P type region having a pair of legs 26A which represents the body of resistor $R_2$ and 37A which represents the body of resistor $R_3$. They share a common contact 50 made through contact opening 51 to metallization segment 52 which is connected to voltage source $V_2$. Accordingly, with the structure shown, since the resistors $R_2$ and $R_3$ share a common contact to voltage source $V_2$, if there is a structural failure in contact 50 or contact opening 51, there will be no reactanceless path through resistor $R_2$, as well as no alternative reactance path through resistor $R_3$, and the DC test will indicate a fail.

In addition, since resistor $R_2$ is disposed very close to resistor $R_3$, a structural failure to resistor $R_2$ is likely to also affect resistor $R_3$ as previously described.

Figure 6A:
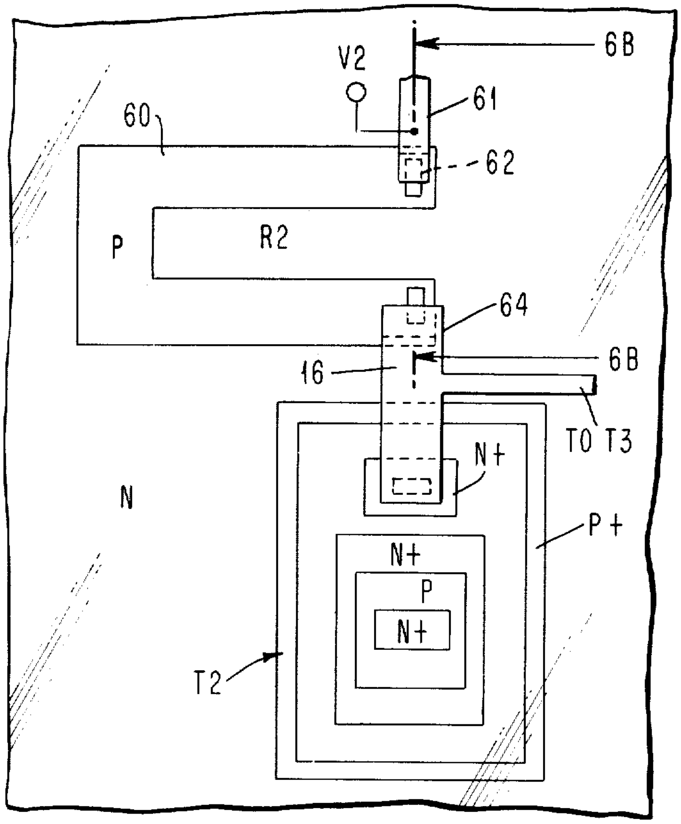
FIG. 6A is a plan view of an integrated circuit layout embodying the schematic equivalent circuit of FIG. 6.
Figure 6:
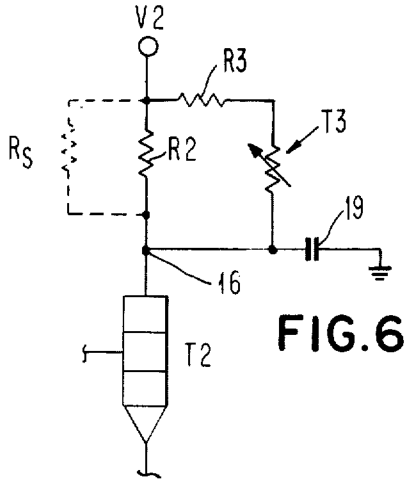
FIG. 6 is the schematic equivalent circuit illustrating another modification of the equivalent circuit of FIG. 2A in accordance with the present invention.
Figure 6B:
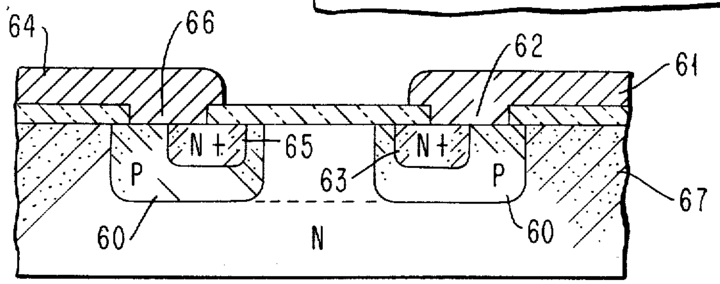
FIG. 6B is a partial cross-sectional view of the integrated circuit structure of FIG. 6A along line 6B—6B.

In accordance with another expedient in the implementation of a present invention, there is shown in the equivalent circuit schematic of FIG. 6 a modification which may be made in the circuit of FIG. 2A in order to provide an additional reactanceless path which shunts the alternative reactance path in the event of structural failure in the original reactanceless path. This shunting reactanceless path has a resistance so low as compared to the original reactanceless path that it, in effect, acts like a short circuit which forces a DC test failure. An integrated circuit embodiment of the circuit schematic in FIG. 6 is shown in FIGS. 6A and 6B. P region 60, which provides resistor $R_2$, is connected to interconnector 61 through contact opening 62. Interconnector 61 also makes contact with N+ contact region 63 through the same opening. Voltage source $V_2$ is connected to interconnector 61. At the other end of P resistor 60, interconnector segment 64 makes contact with P region 60 as well as N+ contact diffusion 65 through contact opening 66. Interconnector 64 servess to connect resistor $R_2$ through node 16 to the collector of transistor $T_2$.

Figure 6C:
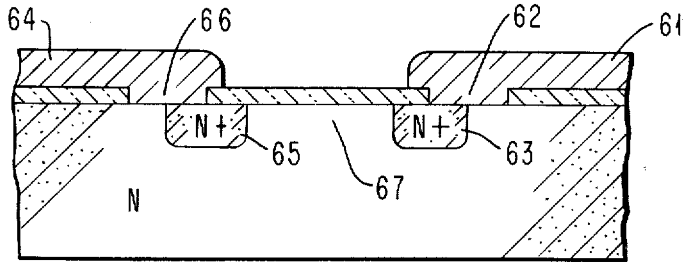
FIG. 6C is a cross-sectional view of the circuit shown in FIG. 6B with the P type bent resistor missing.

Accordingly, if as shown in the cross-section of FIG. 6C P type resistor region 60 is missing, the path between connector segments 61 and 64 will proceed through the short distance in the N type substrate region 67 which separates N+ contact diffusions 63 and 65. This short resistive path which is shown as $R_s$ in the schematic of FIG. 6 is a path of sufficiently low resistance, the voltage $V_2$ is essentially shorted to the collector of transistor $T_2$, thereby rendering transistor $T_2$ substantially inoperative with respect to propagating DC signals. As a result, the DC testing should properly indicate a "fail." On the other hand, if P region 60 is present, the path through $R_2$ will be intact and contact regions 60 and 63 will be ineffectual because they will be isolated by the PN junction formed between regions 63 and 67.

Figure 6D:
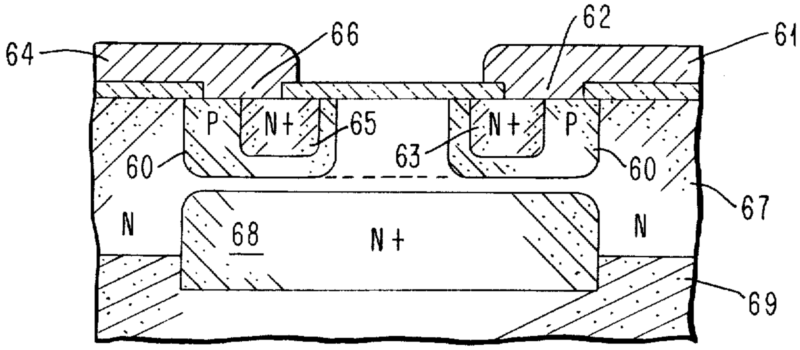
FIG. 6D is a cross-sectional view similar to FIG. 6B of another integrated circuit layout embodying the schematic circuit of FIG. 6.

The cross-sectional view in FIG. 6D is essentially the same as that of FIG. 6B except that N+ buried region 68 is provided at the interface of the substrate 67 which is epitaxial and the supporting substrate 69. The structure of FIG. 6D is particularly valuable where region 67 has a relatively high resistance. In such a case, where P+ resistance region 60 is missing, the relatively low resistivity shunting path is provided between contact diffusion 63, buried N+ region 68 and contact diffusion 65.

Figure 7A:
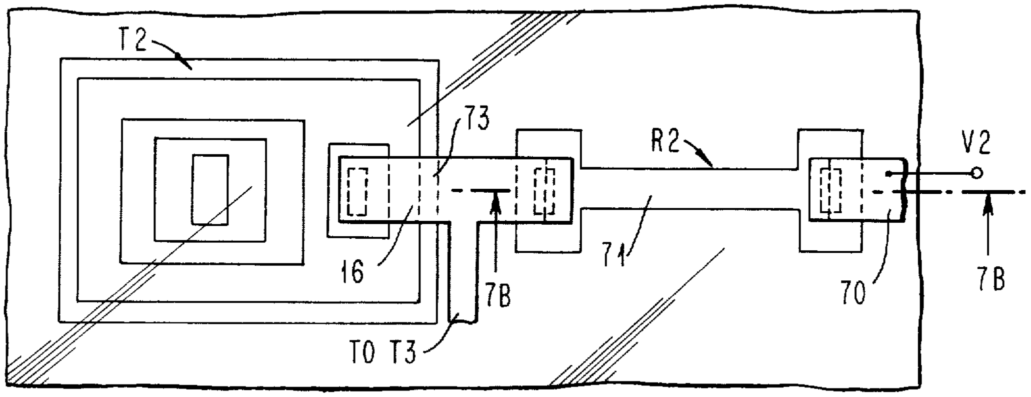
FIG. 7A is a plan view of the integrated circuit configuration embodying the equivalent circuit of FIG. 7.
Figure 7B:
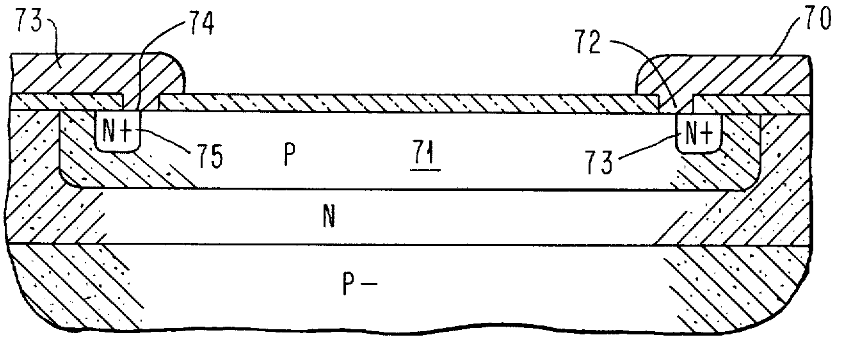
FIG. 7B is a cross-sectional view along line 7B—7B of FIG. 7A.
Figure 7C:
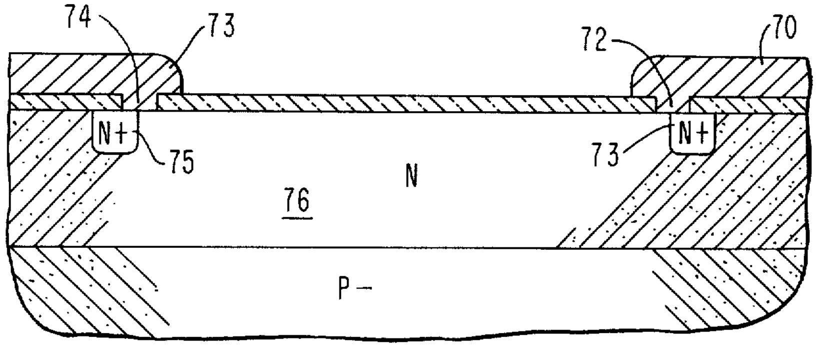
FIG. 7C is a cross-sectional structure shown in FIG. 7B with the P type resistor missing.
Figure 7:
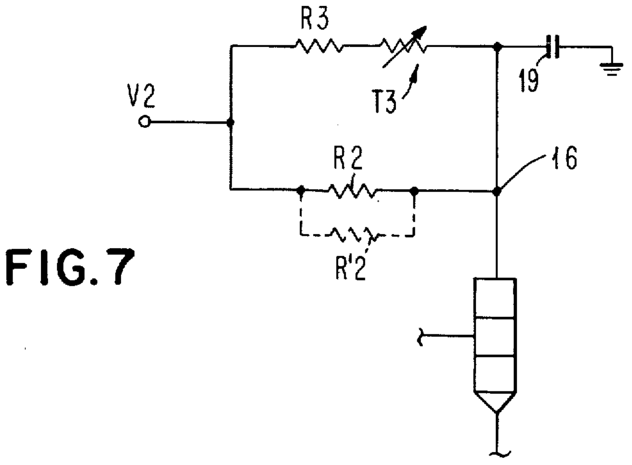
FIG. 7 is a schematic equivalent circuit which is another modification of the equivalent circuit of FIG. 2A in accordance with the present invention.

FIG. 7 is a schematic equivalent circuit which is a modification of the equivalent circuit shown in 2a to include another implementation of the present invention wherein an additional reactanceless path shunts the possible alternative reactance path in the event of structural failure of the original reactanceless path. In this implementation, the shunting reactanceless path has a resistance sufficiently close to that of the original path so as to serve the function of the original path in the actual integrated circuit operation.

FIGS. 7A, B and C illustrate the integrated circuit embodiment of this expedient. Conductive interconnector 70 connects voltage source $V_2$ to P resistor region 71 which functions as resistor $R_2$. Interconnector 70 makes contact with this P region through contact opening 72 wherein it also contacts N+ contact diffusion 73. The other end of P resistor 71 is connected to conductive interconnector 73 through contact opening 74. Interconnector 73 also makes contact with N+ contact diffusion 75. Transistor $T_2$ is connected to resistor $R_2$ via interconnector 73 which traverses node 16. If P type resistor 71 is missing, shunting path $R'_2$ shown in FIG. 7 will exit from interconnector 70 to contact diffusion 73 across N type region 76 to contact diffusion 75 to interconnector 73. This path will have a resistance substantially the same as the path in FIG. 7B through resistor 71. Accordingly, in the event that resistor 71 is missing, there will be an equivalent path of equal resistance which will shunt the reactance path through resistor $R_3$ and permit the circuit to "pass" the DC test and to function properly in the operation of the integrated circuit.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an integrated semiconductor circuit comprising a plurality of active and passive devices interconnected by conductive means into a selected circuit configuration, a structure for eliminating a circuit path which would be alternative to a first path between two circuit nodes in the event of a structural failure within said first path comprising a resistor region of one conductivity-type in said first path connecting said two circuit nodes, said resistor being surrounded by a substrate of opposite conductivity-type and, a pair of contacts to said resistor for connecting said resistor into said first path, and a pair of regions of said opposite conductivity-type, each respectively also in contact with a corresponding one of said pair of contacts, said pair of regions being fully enclosed by and, thereby, junction-isolated from each other by said resistor region, and disposed outside of the most direct linear path between said pair of contacts within said resistor, whereby, in the event said resistor is missing and said junction isolation not present, a path is provided between said pair of contacts through said pair of opposite-type regions which shunts and, thereby, eleminates said alternative circuit path.

2. The structure of claim 1 wherein said pair of contacts are relatively close to each other and said resistor region is bent so as to provide an elongated first path between said pair of contacts through said resistor.

3. The structure of claim 1 wherein said pair of regions of opposite-type conductivity have a lower resistivity than said resistor region, whereby in the event said resistor is missing a low resistivity path is provided between said pair of regions through said substrate also of opposite-type conductivity to shunt and short-circuit said alternative path.

4. The structure of claim 3 wherein said substrate further includes a low resistivity buried region of said opposite conductivity-type spaced from and disposed between said pair of regions.

5. The structure of claim 1 wherein substrate of opposite conductivity-type has resistivity substantially the same as said resistor region whereby the path between said pair of contacts through said pair of opposite type regions and through said substrate which shunts said alternative circuit path is a path having substantially the same resistance as the path through said missing resistor would have had.

6. In an integrated semiconductor circuit comprising a plurality of active and passive devices interconnected by conductive means into a selected circuit configuration, a structure for eliminating a circuit path which would be alternative to a first path between two circuit nodes in the event of a structural failure within said first path comprising a resistor region of one conductivity-type in said first path connecting said two circuit nodes, said resistor being surrounded by a substrate of opposite conductivity-type a pair of spaced contacts to said resistor for connecting said resistor into said first path, and means for connecting said alternative path to said resistor region including a third contact to said resistor region spaced from said pair of contacts, and one of said pair of contacts which is common to both said first path and said alternative path, wherein said common and third contacts are also in contact with a region of said opposite conductivity-type of lower resistivity than said resistor region and fully enclosed within said resistor region, whereby said alternative path is in series with that portion of said resistor region between said third and common contacts so that any defect in said resistor portion will disrupt said alternative path.

* * * * *

UNITED STATES PATENT AND TRADEMARK OFFICE

CERTIFICATE OF CORRECTION

PATENT NO. : 3,922,707

DATED : November 25, 1975

INVENTOR(S) : Larry E. Freed, William J. Nestork, Daniel Tuman

It is certified that error appears in the above-identified patent and that said Letters Patent are hereby corrected as shown below:

| | |
|---|---|
| Column 1, Line 23 (In the Application, Page 2, Line 42 ) | delete the word, "the" |
| Column 1, Line 63 (In the Application, Page 3, Line 14) | following "to" delete -- a -- |
| Column 3, Line 1 (In the Application, Page 5, Line 47) | delete "modes" and substitute therefor -- nodes -- |
| Column 3, Line 52 (In the Application, Page 7, Line 18) | after "will" insert -- not -- |
| Column 5, Line 43 (In the Application, Page 12, Line 7) | delete "anay" and substitute therefor -- any -- |
| Column 6, Line 21 (In the Application, Page 13, Line 25) | delete "iis" and substitute therefore -- is -- |
| Column 6, Line 62 (In the Application, Page 15, Line 6) | delete "(0)" and substitute therefor -- ("0") |
| Column 7, Line 64 (In the Application, Page 17, Line 16) | delete "$R_2$" and substitute therefor -- $V_2$ -- |

UNITED STATES PATENT AND TRADEMARK OFFICE

CERTIFICATE OF CORRECTION

PATENT NO. : 3,922,707

DATED : November 25, 1975

INVENTOR(S) : Larry E. Freed, William J. Nestork, Daniel Tuman

It is certified that error appears in the above-identified patent and that said Letters Patent are hereby corrected as shown below:

Column 8, Line 49 (In the Application, Page 19, Line 11) delete "mode" and substitute therefore -- node --

Column 9, Line 11 (In the Application, Page 20, Line 10) delete "upo" and substitute therefor -- upon --

Column 10, Line 1 (In the Application, Pages 22, Line 9) delete "servess" and substitute therefor -- serves --

Column 10, Line 11 (In the Application, Page 22, Line 19) following "tance" delete "the" and substitute therefor -- that --

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*